US010225979B2

(12) United States Patent
Trask

(10) Patent No.: US 10,225,979 B2
(45) Date of Patent: Mar. 12, 2019

(54) METHOD OF PERFORMING A CLEANOUT PROCESS OF A MOBILE MACHINE PLUMBING SYSTEM

(71) Applicant: AGCO Corporation, Hesston, KS (US)

(72) Inventor: Dean L. Trask, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 113 days.

(21) Appl. No.: 15/350,241

(22) Filed: Nov. 14, 2016

(65) Prior Publication Data

US 2017/0144180 A1 May 25, 2017

Related U.S. Application Data

(60) Provisional application No. 62/258,642, filed on Nov. 23, 2015.

(51) Int. Cl.
*A01C 23/04* (2006.01)
*B05B 14/00* (2018.01)
(Continued)

(52) U.S. Cl.
CPC .......... *A01C 23/047* (2013.01); *A01G 25/023* (2013.01); *A01G 25/16* (2013.01);
(Continued)

(58) Field of Classification Search
CPC ......... B05B 1/02; B05B 13/005; B05B 14/00; A01C 23/007; A01C 23/008;
(Continued)

(56) References Cited

U.S. PATENT DOCUMENTS

| 4,530,465 | A | | 7/1985 | Gauchet et al. |
| 4,553,702 | A | * | 11/1985 | Coffee ................ A01M 7/0092 222/23 |
| 4,723,709 | A | | 2/1988 | Curran, Jr. et al. |
| 7,303,145 | B2 | * | 12/2007 | Wysong ................ A62C 27/00 239/104 |

(Continued)

FOREIGN PATENT DOCUMENTS

| DE | 20 2004 020652 U1 | 10/2005 |
| EP | 2522222 A2 | 11/2012 |

(Continued)

OTHER PUBLICATIONS

European Patent Office, International Search Report for related EP Application No. EP16192773.6, dated May 8, 2017.
(Continued)

*Primary Examiner* — Darren W Gorman

(57) ABSTRACT

A system and method for dispensing a liquid product from a mobile machine includes opening and closing a plurality of valves of a plumbing circuit, the plumbing circuit having a first fluid circuit and a second fluid circuit. Under influence of a pressurized gas, a flow of liquid product flows through plumbing of the first fluid circuit that has a temporarily inactive centrifugal pump and a flow of liquid product through plumbing of the second fluid circuit that has a boom plumbing assembly with plural nozzles coupled to the boom plumbing assembly. The flow of the liquid product through the first and second fluid circuits is controlled by the opening and closing of the plurality of valves and dispensing the liquid product of the first and second fluid circuits to either a product tank or through the plurality of nozzles based on the flows through the first and second fluid circuits.

14 Claims, 10 Drawing Sheets

(51) Int. Cl.
   *B05B 13/00* (2006.01)
   *A01M 7/00* (2006.01)
   *B05B 1/02* (2006.01)
   *A01G 25/02* (2006.01)
   *A01G 25/16* (2006.01)

(52) U.S. Cl.
   CPC ................. *A01M 7/00* (2013.01); *B05B 1/02* (2013.01); *B05B 13/005* (2013.01); *B05B 14/00* (2018.02)

(58) Field of Classification Search
   CPC .... A01C 23/047; A01G 25/023; A01G 25/16; A01G 25/162; A01M 7/00; A01M 7/0042; A01M 7/0089
   USPC ..... 239/1, 11, 106, 112, 113, 119, 124, 127, 239/159, 170
   See application file for complete search history.

(56) References Cited

U.S. PATENT DOCUMENTS

| 2006/0219807 | A1 | 10/2006 | Fulkerson et al. |
| 2008/0197207 | A1 | 8/2008 | Engelbrecht et al. |
| 2014/0252111 | A1* | 9/2014 | Michael ................ B05B 15/025 239/11 |
| 2016/0309647 | A1* | 10/2016 | Bittner ................ A01M 7/0089 |

FOREIGN PATENT DOCUMENTS

| EP | 2907386 A1 | 8/2015 |
| FR | 2516348 A1 | 5/1983 |

OTHER PUBLICATIONS

UK Intellectual Property Office, International Search Report for related UK Application No. GB1522172.4, dated Jul. 1, 2016.

* cited by examiner

| STAGE | FUNCTION | TIME(SEC) | BOOM TILT | VLV#1 | VLV#2 | VLV#3 | VLV#4 | VLV#5 | VLV#6 | VLV#7 | VLV#8 |
|---|---|---|---|---|---|---|---|---|---|---|---|
| STAGE 1 | BSO HOSE | 15 | DOWN | 1 | 1 | 0 | 0 | 1 | 1 | 0 | 0 |
| STAGE 1 | CLOSE VLVS | 1 | DOWN | 0 | 0 | 0 | 0 | 0 | 0 | 0 | 0 |
| STAGE 2 | SLMP | 30 | DOWN | 0 | 0 | 1 | 0 | 0 | 0 | 1 | 0 |
| STAGE 2 | CLOSE RECIR | 1 | DOWN | 0 | 0 | 0 | 0 | 0 | 0 | 1 | 0 |
| STAGE 3 | BMPLMB OUTER | 40 | DOWN | 0 | 0 | 0 | 0 | 0 | 1 | 1 | 0 |
| STAGE 3 | BMPLMB OUTER | 40 | UP | 0 | 0 | 0 | 0 | 0 | 1 | 1 | 0 |
| STAGE 3 | BMPLMB OUTER | 20 | DOWN | 0 | 0 | 0 | 0 | 0 | 1 | 1 | 0 |
| STAGE 4 | BMPLMB INNER | 30 | DOWN | 1 | 1 | 1 | 0 | 0 | 1 | 1 | 0 |
| STAGE 4 | BMPLMB INNER | 30 | UP | 1 | 1 | 1 | 0 | 0 | 1 | 1 | 0 |
| STAGE 4 | CLOSE VLVS | 1 | UP | 0 | 0 | 0 | 0 | 0 | 0 | 0 | 0 |

FIG. 5

METHOD OF PERFORMING A CLEANOUT PROCESS OF A MOBILE MACHINE PLUMBING SYSTEM

CROSS REFERENCE TO RELATED APPLICATION

This application claims the benefit of U.S. Provisional Application No. 62/258,642 filed Nov. 23, 2015, which is hereby incorporated by reference in its entirety.

BACKGROUND

Field of Invention

The present disclosure is generally related to mobile machines and, more particularly, plumbing systems for mobile machines that dispense liquid product.

Description of Related Art

Mobile machines that dispense liquid product are used in some industries. For instance, in the agricultural industry, sprayers are used to dispense liquid product in the form of chemicals that achieves various results, such as fertilizes crops, kills weeds, and/or prevents infestation of, or eliminates, pests. In the forestry industry, mobile machines may be used to dispense product that provides, for instance, mosquito or other pest control. These sprayers may be self-propelled or towed, but they all have in common the need for plumbing to draw liquid product from a tank and dispense the liquid product to an intended target(s). Eventually, when a job is completed, whether at the end of the day or at the end of a multi-day (or otherwise) project, attempts are made to purge or evacuate the residual product from the plumbing. In some instances, such as when the job is interrupted (e.g., by rainfall), attempts are made to recover product from the plumbing and return it to a main product tank.

BRIEF SUMMARY OF THE INVENTION

In one embodiment, the invention is directed to a method that includes opening and closing a plurality of valves of a plumbing circuit, the plumbing circuit comprising a first fluid circuit and a second fluid circuit; causing, under influence of a pressurized gas, a flow of liquid product through plumbing of the first fluid circuit that comprises a temporarily inactive centrifugal pump and a flow of liquid product through plumbing of the second fluid circuit that comprises a boom plumbing assembly having plural nozzles coupled to the boom plumbing assembly, the flow of the liquid product through the first and second fluid circuits controlled by the opening and closing of the plurality of valves; and dispensing the liquid product of the first and second fluid circuits to either a product tank or through the plurality of nozzles based on the flows through the first and second fluid circuits.

Another aspect of the invention is directed to a mobile machine plumbing system. The system includes a plumbing circuit having an inlet port for receipt of pressurized gas and plumbing that includes a plurality of valves. The plumbing circuit includes a product tank, a first fluid circuit, and a second fluid circuit. The first fluid circuit includes a centrifugal pump coupled on a downstream end of the centrifugal pump to a main delivery line. A sump valve and a product recovery upstream valve are coupled to an upstream end of the centrifugal pump. A recirculatory valve is coupled to the product tank, the product recovery upstream valve and a recirculatory line. The second fluid circuit includes a boom plumbing assembly and a plurality of nozzles coupled to the boom plumbing assembly. The second fluid circuit also includes a serial arrangement of a main shut-off valve, a center boom feed valve, and a product recovery rear manifold valve. The main shut-off valve is coupled to the main delivery line, the product recovery rear manifold valve is coupled to the plurality of nozzles, and the center boom feed valve and the product recovery rear manifold valve are coupled to the recirculatory line. The system also includes one or more controllers configured to deactivate the centrifugal pump, and while the centrifugal pump is deactivated, actuate the plurality of valves in a predefined manner to cause, under influence of the gas provided to the inlet port, a flow of liquid product through the plumbing of the first fluid circuit and a flow of liquid product through the plumbing of the second fluid circuit and to dispense the liquid product of the first and second fluid circuits to either a product tank or through the plurality of nozzles based on the flows.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

Many aspects of a mobile machine plumbing system can be better understood with reference to the following drawings. The components in the drawings are not necessarily to scale, emphasis instead being placed upon clearly illustrating the principles of the mobile machine plumbing system. Moreover, in the drawings, like reference numerals designate corresponding parts throughout the several views.

FIG. 5 is a schematic diagram that illustrates an example schedule to provide direction as to sequencing and actions associated with the stages described for FIGS. 4A-4D.

DESCRIPTION OF EXAMPLE EMBODIMENTS

Figure 1:
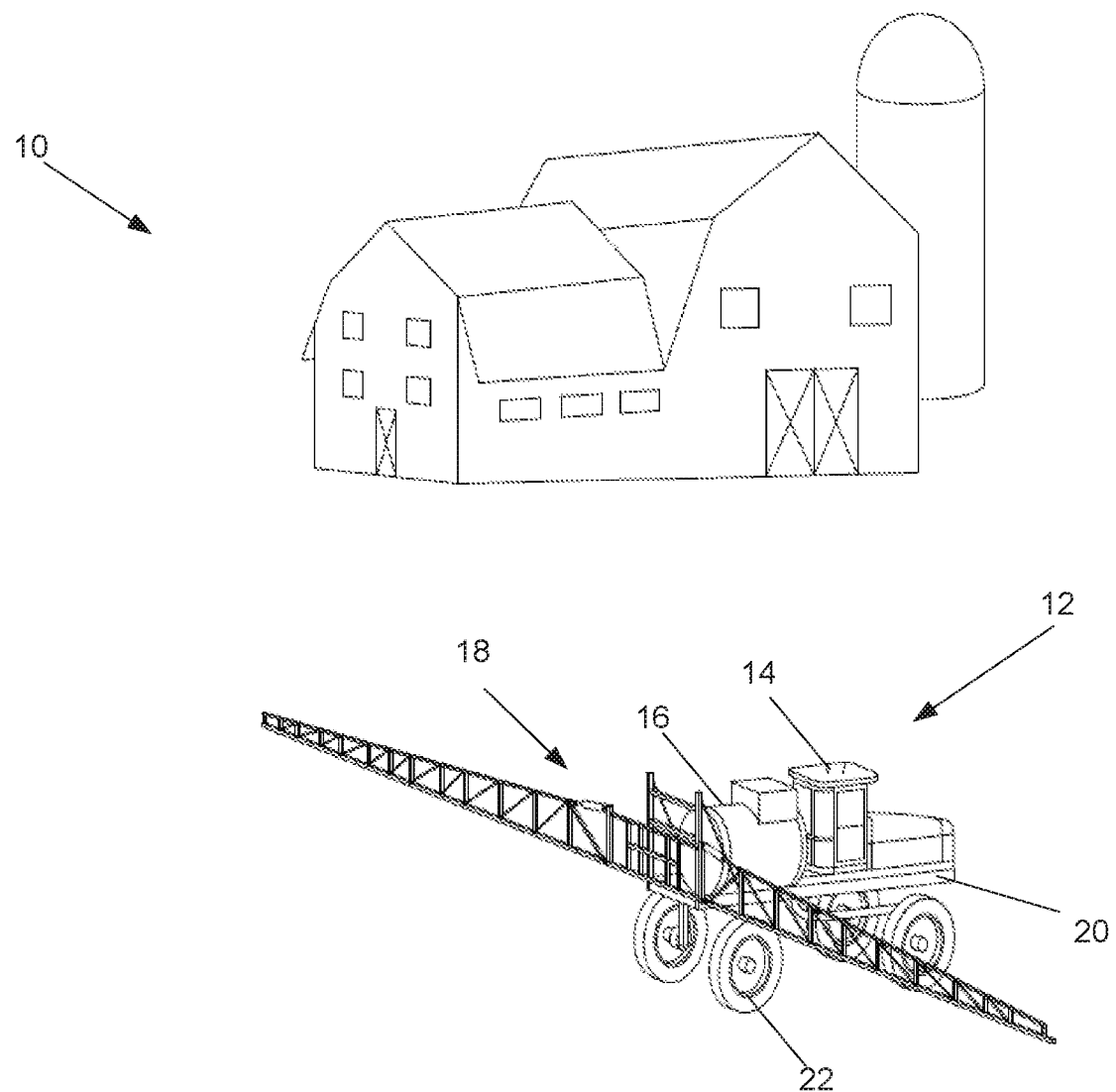
FIG. 1 is a schematic diagram that illustrates an example environment in which certain embodiments of a mobile machine plumbing system may be used.

Certain embodiments of a mobile machine plumbing system and associated method are disclosed that efficiently and comprehensively cleanout (or evacuate) and recover liquid product. The mobile machine may be a self-propelled machine or a towed machine (e.g., comprising a hitched chassis) that supports a tank and associated plumbing and that dispenses liquid product onto a target at a localized dispensing location (e.g., to a product tank in one embodiment, or underneath the boom nozzles in another embodiment). The liquid product may comprise an aqueous chemical solution, such as a herbicide, fertilizer, and/or pest control chemicals, and the target may be plants (e.g., weeds, crops, etc.), pests, and/or the soil. In one embodiment, the mobile machine plumbing system comprises a plumbing circuit that includes a product tank, a first fluid circuit, and a second fluid circuit, the first fluid circuit comprising a centrifugal pump and plumbing located on one side of the highest point of the plumbing circuit, the second fluid circuit comprising a boom plumbing assembly and plumbing located on the other side of the highest point. An embodiment of the mobile machine plumbing system provides for the cleanout of residual liquid product in the first and second fluid circuits based on an injection of pressurized gas (e.g., air) into the plumbing circuit and a directing and controlling of liquid product flow via actuated (e.g., electrically, pneumatically, hydraulically, etc.) opening and closing of a plurality of control valves (also referred to herein as valves) of the plumbing circuit. Another embodiment of the mobile machine plumbing system provides for a multi-stage recovery (e.g., to the product tank) of liquid product remaining in the entire primed plumbing circuit.

Digressing briefly, residual product cleanout for the plumbing of existing mobile machine dispensing systems only function to purge the boom plumbing assembly located downstream of the highest point of the system. An operator has to drain the residual product of a main delivery line, at the highest point from a side reload fill point, to the ground. Similarly, recovery systems serve only to recover the downstream boom plumbing assembly, with the liquid product located upstream of the highest point of the system discharged to the ground (e.g., using the side reload fill point). In contrast, certain embodiments of a mobile machine plumbing system provide cleanout for both the upstream and downstream of the highest point (e.g., the first and second fluid circuits) for discharge at a localized dispensing location. Also in contrast to existing systems, certain embodiments of a mobile machine plumbing system automatically reclaim the majority of primed liquid product at the product tank from both upstream and downstream of the highest point. By implementing certain embodiments of a mobile machine plumbing system, liquid product is more comprehensively purged from the plumbing system in cleanout. For recovery, liquid product need not be drained onto the ground from the side reload fill point, the plumbing of the boom plumbing assembly is void of chemicals enabling less volume of rinse water, there is less liquid product waste, and/or there are fewer risks to the environment.

Having summarized certain features of various embodiments of a mobile machine plumbing system of the present disclosure, reference will now be made in detail to the description of a mobile machine plumbing system as illustrated in the drawings. While the disclosure is described in connection with these drawings, there is no intent to limit it to the embodiment or embodiments disclosed herein. For instance, in the description that follows, the focus is on agricultural implementations using a self-propelled sprayer that dispenses liquid product (e.g., spray chemicals) onto vegetation or other targets, with the understanding that the mobile machine may be used for different applications in the same industry, or the same or different application in other industries. As another example, the mobile machine may be embodied as a towed machine, or a self-propelled machine for dispensing of different products. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example environment 10 in which certain embodiments of a mobile machine plumbing system may be used. One having ordinary skill in the art should appreciate in the context of the present disclosure that the example environment 10 is merely illustrative, and that mobile machine plumbing systems may be implemented in other environments and/or used for other applications. The environment 10 is depicted as an agricultural environment, with a mobile machine 12 depicted as a self-propelled spraying machine having a cab 14, a product tank 16, and a boom plumbing assembly 18, all supported by a chassis 20 that includes plural (e.g., four (4)) wheels 22. The boom plumbing assembly 18 is attached to a boom that may be foldable, and with a capability to be logically divided into separately controlled sections, and a further capability to be raised and lowered as well as tilted. In some embodiments, tracks may be used in place of all or a portion of the wheels 22, and in some embodiments, a different quantity of wheels 22 may be used based on a different axle configuration. The boom plumbing assembly 18 is coupled to the product tank 16, and comprises various plumbing including a plurality of nozzles (not shown in FIG. 1) distributed across the boom plumbing assembly 18 (which is distributed across the boom), the plurality of nozzles used to dispense liquid product to the ground (e.g., the soil, vegetation, etc.) as the mobile machine 12 traverses the field. In one embodiment, the product tank 16 and the boom plumbing assembly 18 are part of a plumbing circuit of an embodiment of the mobile machine plumbing system.

Figure 2:
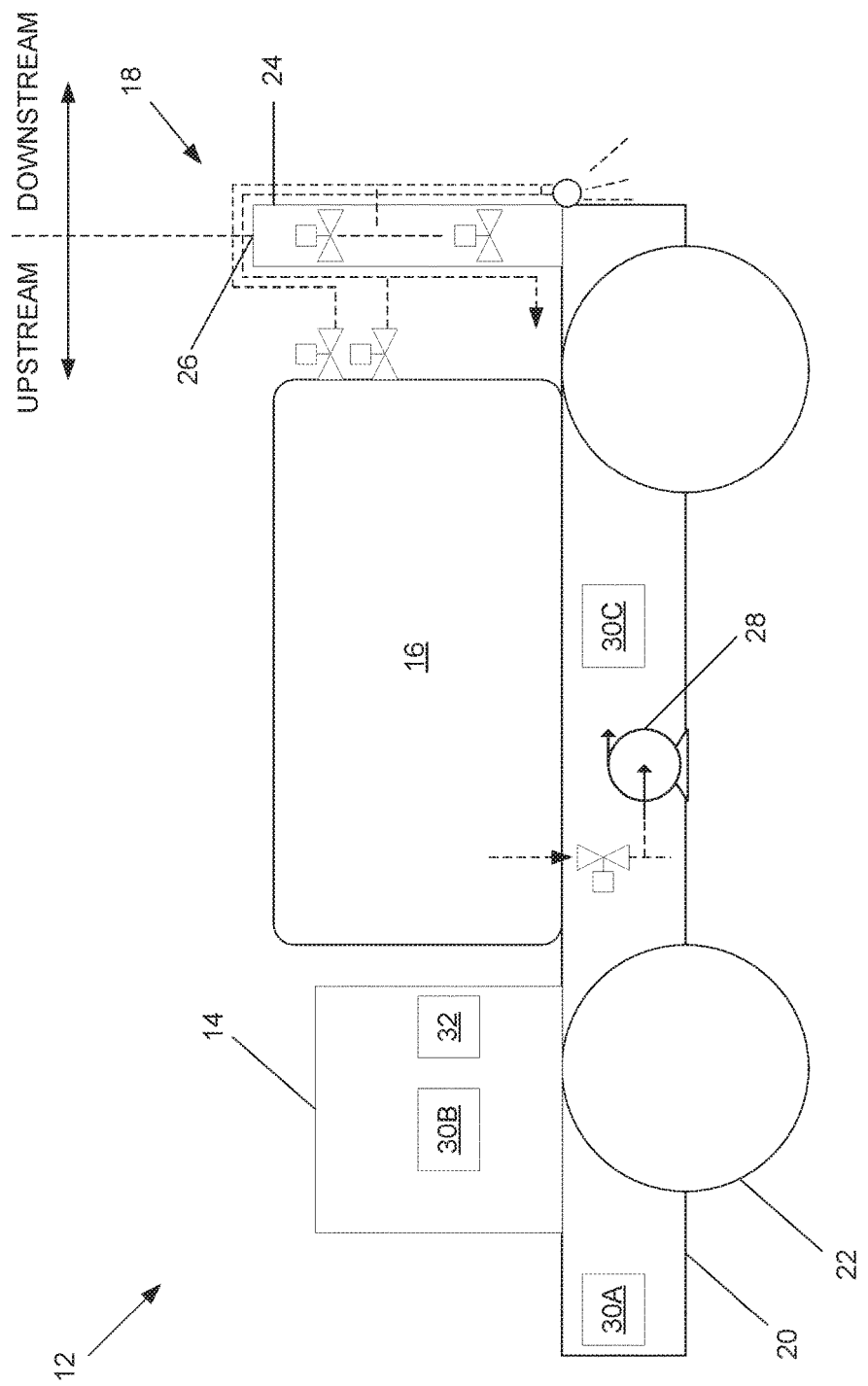
FIG. 2 is a schematic diagram that illustrates in fragmentary side elevation view an example mobile machine that hosts an embodiment of a mobile machine plumbing system.

Attention is now given to FIG. 2, which illustrates in fragmentary side elevation view the example mobile machine 12 (e.g., FIG. 1) that hosts an embodiment of a mobile machine plumbing system. It should be appreciated that since the mobile machine 12 is depicted in fragmentary view, various known portions of the mobile machine 12 are omitted for brevity. The mobile machine 12 comprises features described previously in association with FIG. 1, including the cab 14, the product tank 16 (e.g., for holding liquid product), the boom plumbing assembly 18, the chassis 20, and the wheels 22. It is noted that the boom plumbing assembly 18 is secured to a frame structure 24, and which, due to its height (e.g., it represents the highest point of the plumbing circuit), serves as a dividing line between a first fluid circuit and a second fluid circuit of the plumbing circuit. In other words, the first fluid circuit comprises plumbing located upstream of a highest point 26, whereas a second fluid circuit of the plumbing circuit comprises plumbing that is located downstream of the highest point 26. Also depicted in FIG. 2 is a centrifugal pump 28, which is part of the first fluid circuit, and used to influence the flow of liquid product through the first and second fluid circuits of the plumbing circuit. When the process of cleanout or recovery is to be performed, the centrifugal pump 28 is temporarily deactivated (e.g., inactive). Also shown are plural user interfaces (UIs) 30, which include a user interface 30A in the front of the mobile machine 12, a user interface 30B in the cab 14 of the mobile machine 12, and a user interface 30C on the side of the mobile machine 12. In some embodiments, a different quantity of user interfaces 30 may be used and/or the user interface(s) 30 may be located in different locations. The user interfaces 30 enable an operator to initiate (and end) the cleanout and recovery processes, and in one embodiment, are coupled to a controller 32 via a network (e.g., wired or wireless), as described further below.

Figure 3:
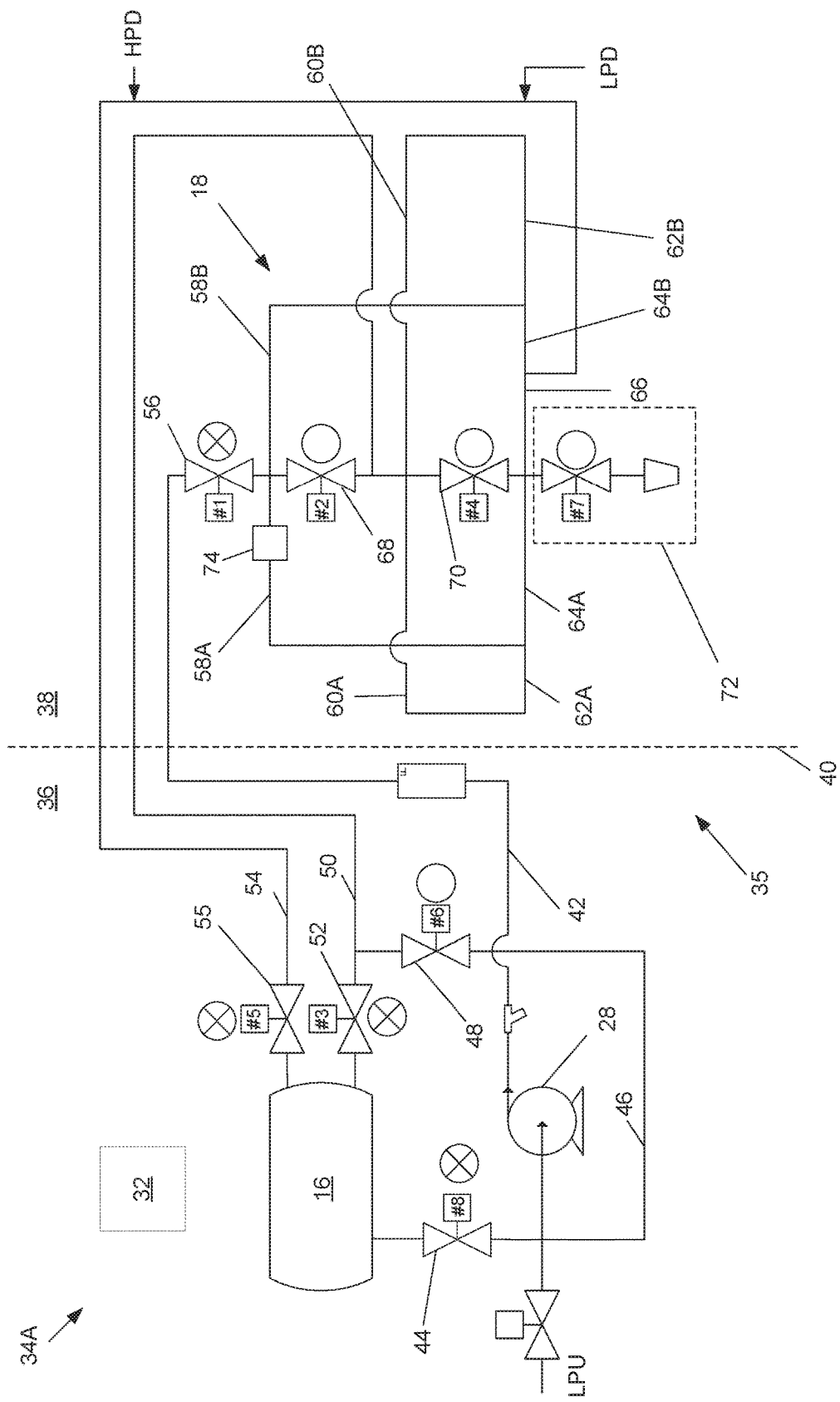
FIG. 3 schematic diagram that illustrates in fragmentary view an embodiment of a mobile machine plumbing system that is configured to perform a cleanout process.

Referring now to FIG. 3, shown is an embodiment of a mobile machine plumbing system 34A that is configured to perform a cleanout process. Note that certain known components of a plumbing system common to mobile machine plumbing systems are omitted to avoid obfuscating the primary features, such omitted components including a spurge valve and line, bypass valve and line, rinse valve and line, rinse tank, eductor fluid circuitry, among other components. In one embodiment, the mobile machine plumbing system 34A comprises a plumbing circuit 35 and the controller 32. The plumbing circuit 35 comprises a first fluid circuit 36 and a second fluid circuit 38, and the product tank 16. In some embodiments, the product tank 16 may be considered as part of the first fluid circuit 36. A logical dividing line between the first and second fluid circuits 36 and 38, respectively, is depicted by a dashed line 40. As explained previously, the first and second fluid circuits 36 and 38 are physically separated by the highest point 26, but for purposes of the explanation that follows, the separation is illustrated in FIG. 3 by the dashed line 40. In fact, low and high points for various portions of the plumbing circuit 35 are denoted in FIG. 3 and as described below. Beginning with the first fluid circuit 36, the first fluid circuit 36 comprises plumbing that includes the centrifugal pump 28, a portion of a main delivery line 42 on a discharge or downstream side of the centrifugal pump 28, a sump valve (#8) 44 located at a suction or upstream side of the centrifugal pump 28, an upstream product recovery line 46 also at the suction side of the centrifugal pump 28, and a product recovery upstream valve (#6) 48 disposed in the upstream product recovery line 46. Note that the term "line" may refer to a hose or other conduit that enables the flow of liquid product between plumbing components. The first fluid circuit 36 further comprises at least a portion of a recirculatory line 50 and a recirculatory valve (#3) 52 disposed in (e.g., directly coupled to) the recirculatory line 50. The first fluid circuit 36 further comprises at least a portion of a downstream product recovery line 54 and a product recovery downstream valve (#5) 55. Note the location to the left of the left-most valve (an inlet manifold) is the lowest point upstream (LPU). It is noted that the first fluid circuit 36 comprises other plumbing, such as a (or a plurality of each of a) strainer, flow meter, among other plumbing, the explanation of such known components omitted for brevity.

Referring to the second fluid circuit 38, the second fluid circuit 38 comprises a main shut-off valve (#1) 56 that receives and controls liquid fluid flow from the centrifugal pump 28 over the main delivery line 42, and the boom plumbing assembly 18 that is coupled to the main shut-off valve (#1) 56. The boom plumbing assembly 18 comprises main feed tubes 58 (e.g., left main feed tube 58A, right main feed tube 58B), outer feed tubes 60 (e.g., left outer feed tube 60A, right outer feed tube 60B), outer spray tubes 62 (e.g., left outer spray tube 62A, right outer spray tube 62B), inner spray tubes 64 (e.g., left inner spray tube 64A, right inner spray tube 64B), a center spray tube 66, and a plurality of valves, including a serial arrangement of a center boom feed valve (#2) 68 and a product recovery rear manifold valve (#4) 70. Coupled along the lower portion of the boom plumbing assembly 18 (e.g., to the spray tubes 62, 64, and 66) are a plurality of nozzles (attached to the lowest point downstream or LPD), including one shown and identified in FIG. 3 as nozzle (#7) 72. The second fluid circuit 38 is coupled to the first fluid circuit 36 via the downstream product recovery line 54 (e.g., coupled at the lowest point downstream and peaking in elevation at the highest point downstream or HPD) and the recirculatory line 50 (e.g., coupled between the center boom feed line 68 and the product recovery rear manifold valve (#4) 70). Note that FIG. 3, and FIGS. 4A-4D, are intended as functional diagrams and are not necessarily to scale nor are the diagrams intended as accurate depictions of actual height or relative location.

Also depicted in FIG. 3 are symbolic representations shown in the form of open and "X"-filled circles adjacent the relevant valves of the plumbing circuit 35. The open circle corresponds to an open valve, based in one embodiment on actuation by the controller 32. The X-filled circles correspond to closed valves (e.g., shut-off), based in one embodiment on actuation (or de-actuation) by the controller 32. In other words, the numbered valves of the plumbing circuit 35 comprise control valves with a solenoid or other type of actuator that, when signaled by the controller 32, causes actuation (e.g., causes a normally-open valve to close or a normally-closed valve to open, such as via rotation of a ball, globe, paddle, etc. residing within the valve body structure coupled to the actuator).

The mobile machine plumbing system 34A provides for the cleanout or evacuation of the entire residual liquid product (also referred to herein as residual product, and residual product and liquid product used hereinafter interchangeably except when used together for distinction) in the primed plumbing circuit 35 on both the upstream and downstream sides of the centrifugal pump 28. Cleanout of the residual product is performed with the centrifugal pump 28 deactivated (e.g., inactive or turned off). Residual product includes remnants of the liquid product that cannot be moved and/or exhausted from the plumbing circuit 35 under the influence of the centrifugal pump 28. Pressurized gas (e.g., a constant air supply) is injected at air inlet 74 to push the liquid product back to the boom plumbing assembly 18 based on various stages of sequencing valves (e.g., opening and closing the valves) in the plumbing circuit 35, with the net effect of expelling the liquid product from the plurality of nozzles (#7) 72 distributed across a boom. In general, to clean out the liquid product from the primed plumbing circuit 35, the liquid product needs to be controlled and directed, necessitating that all ports on the product tank 16 and boom plumbing assembly 18 have valves which can be turned on or off. A downstream low point must be established and then hooked up by a small hose to the recirculatory hose or to the boom spray tubes. In other words, low points (LPU and LPD) are established on the upstream and downstream sides of the plumbing circuit 35, and respectively coupled via the upstream product recovery line 46 and the downstream product recovery line 54 to the main product tank 16. An embodiment of mobile machine plumbing system 34A controls the liquid product flow by directing the upstream residual product in the plumbing circuit 35 first, and then lastly directing the downstream residual product in the boom plumbing assembly 18, though some embodiments may reverse the order. As indicated previously, typically, boom cleanout is offered which only purges any residual product in the boom plumbing assembly. One benefit of the mobile machine plumbing system 34A is to be able to direct the flow of, and expel, the residual product from both the upstream and downstream portions of the primed plumbing circuit 35 and evenly distribute the discharge or dispensing of the residual product across the entire boom plumbing assembly 18 to the ground.

In operation, the controller 32 causes the following valves to close (such as prompted by an operator at one of the user interfaces 30, FIG. 2), as represented by the X-filed circles adjacent the respective valves: the main shut off valve (#1) 56, the recirculatory valve (#3) 52, the product recovery downstream valve (#5) 55, and the sump valve (#8) 44. The controller 32 causes (e.g., through sending signals to the respective actuators) the following valves to open, as represented by the open circle adjacent the respective valves: the center boom feed (#2) 68, the product recovery rear manifold valve (#4) 70, the product recovery upstream valve (#6) 48, and the nozzles (#7) 72. Note that the controller 32 causes the valves to open and close at the same time or substantially the same time, though in some embodiments, some delays may be imposed. With the controller 32 sequencing the valves to their corresponding on or off state previously mentioned, the controller 32 also causes pressurized gas (e.g., air) to be injected at the air inlet 74, which in one embodiment, is located in the plumbing circuit 35 downstream of the closed, main shut-off valve (#1) 56. Given their open-position status, all of the nozzles (#7) 72 spray or generally, dispense residual product out to the ground due to (e.g., under the influence of) the air pushing the liquid (residual) product. In effect, a singular flow path of the residual product is established in a manner to first clean out at the highest point downstream (HPD) of the plumbing circuit 35 in the second fluid circuit 38 followed by the cleanout of the residual product from the first fluid circuit 36 (e.g., clean out the residual product from the plumbing back to the centrifugal pump). From FIG. 3, a portion of the air is diverted from the center boom feed valve (#2) 68 through the recirculatory line 50, through the product recovery upstream valve (#6) 48, the upstream product recovery line 46, the centrifugal plump 28, and the main delivery line 42. The residual product influenced by the pressurized air cannot be diverted over the highest point on the plumbing circuit 35 due to the closed main shut off valve (#1) 56. So, under the influence of the pressurized gas, the residual product is pushed in the opposite direction through the main delivery line 42, through the centrifugal pump 28, the upstream product recovery line 46, the product recovery upstream valve (#6) 48, the recirculatory line 50 and through the product recovery rear manifold valve (#4) 70 and out through the nozzles (#7) 72. That is, pressurized air continues to push the residual product through the recirculatory line 50 to the rear boom plumbing assembly 18, enabling the dispensing of the residual product through the nozzles (#7) 72. Once the upstream residual product is forced back to the boom plumbing assembly 18, the main product delivery line 42 and the rear downstream product recovery line 54 are allowed to gravity feed to the lowest point (LPD) on the boom plumbing assembly 18. Air continues to assist to push the entire residual product out the entire boom plumbing assembly, including through the feed tubes 58 and 60 and finally the outer 62 and inner 64 spray tubes and out to a localized dispensing location (e.g., to the ground underneath the nozzles) through the nozzles (#7) 72. In some embodiments, sequencing of the nozzles (#7) 72 in section swaths assists in additional residual removal towards the end of the process. For instance, banks of nozzles (#7) 72 may be sequenced (e.g., by the controller 32, with or without operator intervention) across the boom plumbing assembly 18 while performing the cleanout process.

In some embodiments, the product recovery upstream valve (#6) 48 may be coupled directly (e.g., via a hose or other conduit) to the rear boom plumbing assembly 18, enabling the recirculatory line 50 to be omitted. For instance, the upstream product recover line 46 and the product recovery upstream valve (#6) 48 may be routed to the rear boom manifold assembly 18 and coupled between the recirculatory valve (#3) 52 and the center boom feed valve (#2) 68. In some embodiments, the product recovery downstream valve (#5) 55 may be omitted. In some embodiments, an air relay may be used to increase the velocity of the pressurized gas (e.g., enabling more cubic feet per minute or CFM)) and/or an air pressure regulator may be added to control the boom plumbing pressure (e.g., to match a desired rate), the latter feature enabling the mobile machine 12 (FIG. 1) to be driven with the centrifugal pump 28 in an off state and allowing the residual product to be applied to the field over an extended distance. In some embodiments, a stage may be added for sequencing the main shut-off valve (#1) 56. In other words, the main shut-off valve (#1) 56 may be toggled to the on or open state to permit the air path to be changed to purge any entrapped residual product to the rear boom plumbing assembly 18.

Having described an embodiment of a mobile machine plumbing system 34A that provides for the cleanout or evacuation of the entire residual liquid product in the first and second fluid circuits 36, 38, attention is now directed to an embodiment of a mobile machine plumbing system 34B that is configured to perform a recovery process, as illustrated in FIGS. 4A-4D. In particular, each of the figures represents a stage in the recovery process. Though described as stages 1-4 in association with FIGS. 4A-4D, respectively, it should be appreciated by one having ordinary skill in art in the context of the present disclosure that variations in the order of the process may be implemented, and hence are contemplated to be within the scope of the disclosure. The plumbing circuit 35A is similar to the plumbing circuit 35 (FIG. 3), with minor variations noted below in association with FIGS. 4C-4D, and hence discussion of the same is omitted here for brevity. It is noted that a bolder font line is overlaid on portions of the plumbing circuit 35A in FIGS. 4A-4D to emphasize a focus of the directed flow, with the understanding that liquid product may be influenced in other portions of the plumbing circuit 35 based on the pressurized gas and opening and closing of valves. Also note that FIG. 5, which illustrates an example schedule of valve and/or other device sequences and actions associated with the stages described for FIGS. 4A-4D, may be used to ascertain example timing and sequencing of the stages, though it should be appreciated by one having ordinary skill in the art in the context of the present disclosure that variations of these sequences and timing may be implemented, and hence are contemplated to be within the scope of the disclosure. In FIG. 5, the ones (1s) in the columns underneath the respective valves represent valve open, and the zeroes (0s) represent valve closed. In general, an embodiment of the mobile machine plumbing system 34B provides a process to recover product in the primed plumbing circuit 35A on both the downstream (pressure side) and upstream (suction side) of the centrifugal pump 28. Stated otherwise, the liquid product is recovered from both the first and second fluid circuits 36, 38 of the plumbing circuit 35A at a localized dispensing location (e.g., the product tank 16), unlike conventional systems which focuses on the product recovery from the boom side and discharges any upstream liquid product elsewhere (e.g., at the side reload fill point). Similar to the process for cleanout, recovery of product is performed in a non-application state of a spray system with the centrifugal pump 28 temporarily deactivated (e.g., inactive or turned-off). Pressurized gas (e.g., a constant air supply) is injected at an air inlet 76, which in this embodiment is upstream of the main shut-off valve (#1) 56, the gas deployed in a manner to push the product back to the main product tank 16 through various stages of sequencing valves in the plumbing circuit 35A, as also shown in FIG. 5. To reclaim the liquid product in the entire plumbing circuit 35A, the lowest and highest points (LPD, HPD, LPU) of the plumbing circuit 35A should be determined. In one embodiment, smaller return lines (e.g., the upstream product recovery line 46 and the downstream product recovery line 54) from the lowest points in the system are then connected back to the product tank 16. As with the system 34A in FIG. 3, the centrifugal pump upstream inlet manifold is located at the lowest point (LPU) on the upstream side of the system 34A, and the lowest point on the boom side (LPD) is the plumbing to which the nozzles (#7) 72 are secured to. The highest point (HPD) corresponds to the division between the two fluid circuit (36, 38) flow paths from which the product is recovered. To reclaim liquid product from the primed plumbing circuit 35A, the product flow should be controlled and directed, and as such, all ports on the product tank 16 and the boom plumbing assembly 18 have valves which are to be turned on or off. Also, the boom plumbing is connected across the entire boom width. In one embodiment, the mobile machine plumbing system 34B utilizes the recirculatory line 50 to reclaim or recover the downstream boom plumbing product after the system upstream plumbing is completely recovered, though in some embodiments, this process may be reversed.

Figure 4A:
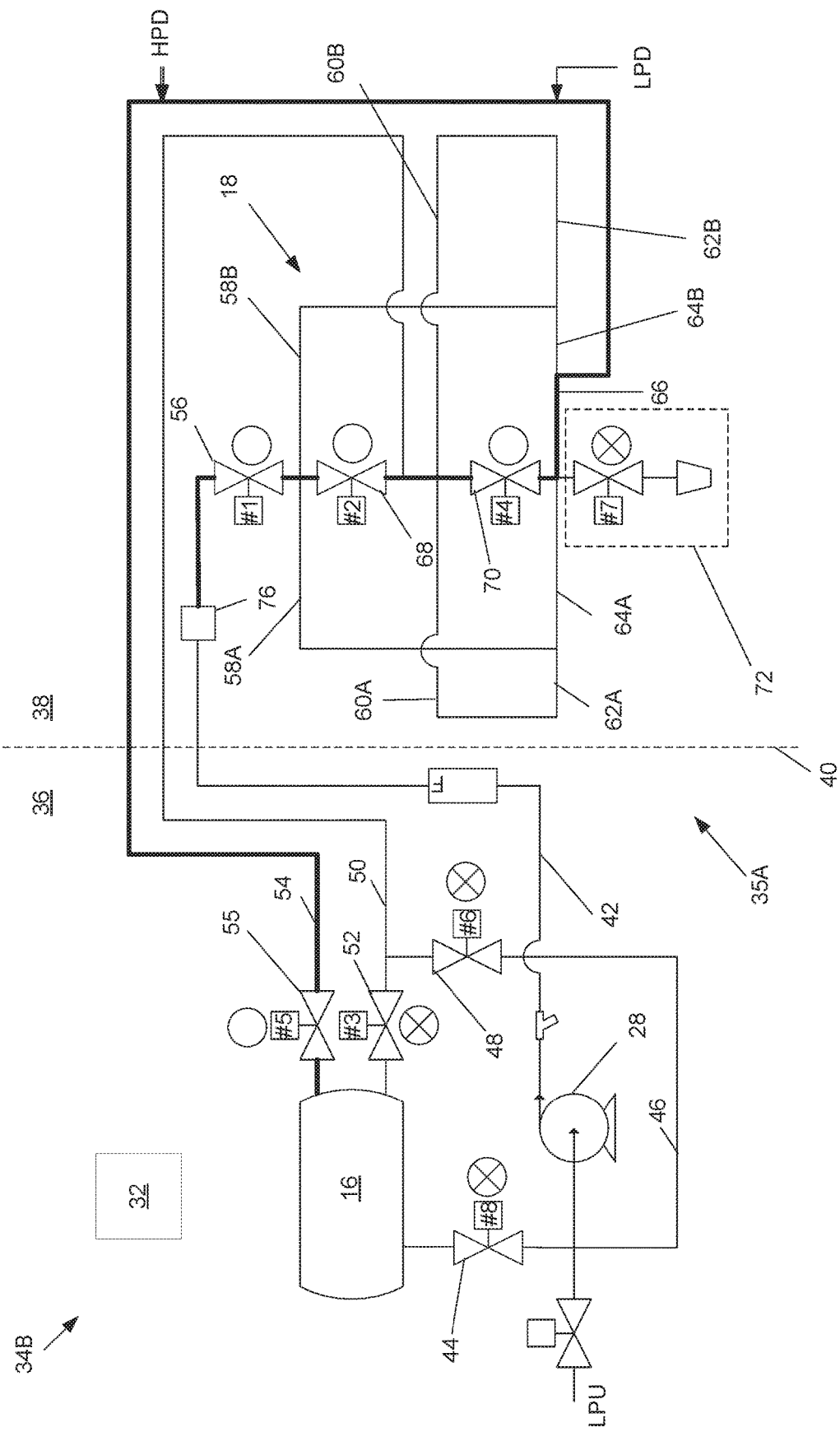
FIGS. 4A-4D are schematic diagram that illustrate in fragmentary view an embodiment of a mobile machine plumbing system that is configured to perform a recovery process.

Referring now to FIG. 4A, an embodiment of the mobile machine plumbing system 34B, according to a first stage (stage 1), recovers product at the highest point on the downstream plumbing circuit 35A to the boom plumbing assembly 18, as represented by the bold overlay over these plumbing sections. In other words, stage 1 processing recovers a portion of the residual product from the air inlet 76, through the valves #1, #2 and #4 (56-70) of the boom plumbing assembly 18, and the downstream product recovery line 54 and back to the product tank 16. The process according to stage 1 enables the highest point to be purged to the rear boom plumbing assembly 18, which is comprised of valves #1, #2 and #4 (56-70), and prevents any residual product from returning back to the centrifugal pump 28 when boom recovery is performed in stage 3. Stage 1 is run for a short duration of time (e.g., fifteen (15) seconds, as shown in FIG. 5 with an added one (1) second for closing all of the valves). In the depicted embodiment, stage 1 involves the controller 32 causing the closure of the following valves of the plumbing circuit 35A, as represented by the X-filed circles adjacent the respective valves: the recirculatory valve (#3) 52, the product recovery upstream valve (#6) 48, the sump valve (#8) 44, and the nozzles (#7) 72. The controller 32 also causes the injection of air via the air inlet 76, and the opening of the following valves, as represented by the open circles adjacent the respective valves: the main shut-off valve (#1) 56, the center boom feed valve (#2) 68, the product recovery rear manifold valve (#4) 70, and the product recovery downstream valve (#5) 55. The result is the flow of the liquid product, under the influence of the pressurized gas and the opening and closing of the valves as described above, from the portion of the recirculatory line 50 downstream of the air inlet 76, through the valves #1, #2, and #4 (56, 68 and 70), through the lowest portion of the boom plumbing assembly 18, through the downstream product recovery line 54, through the product recovery downstream valve (#5) 55, and into the product tank 16.

Figure 4B:
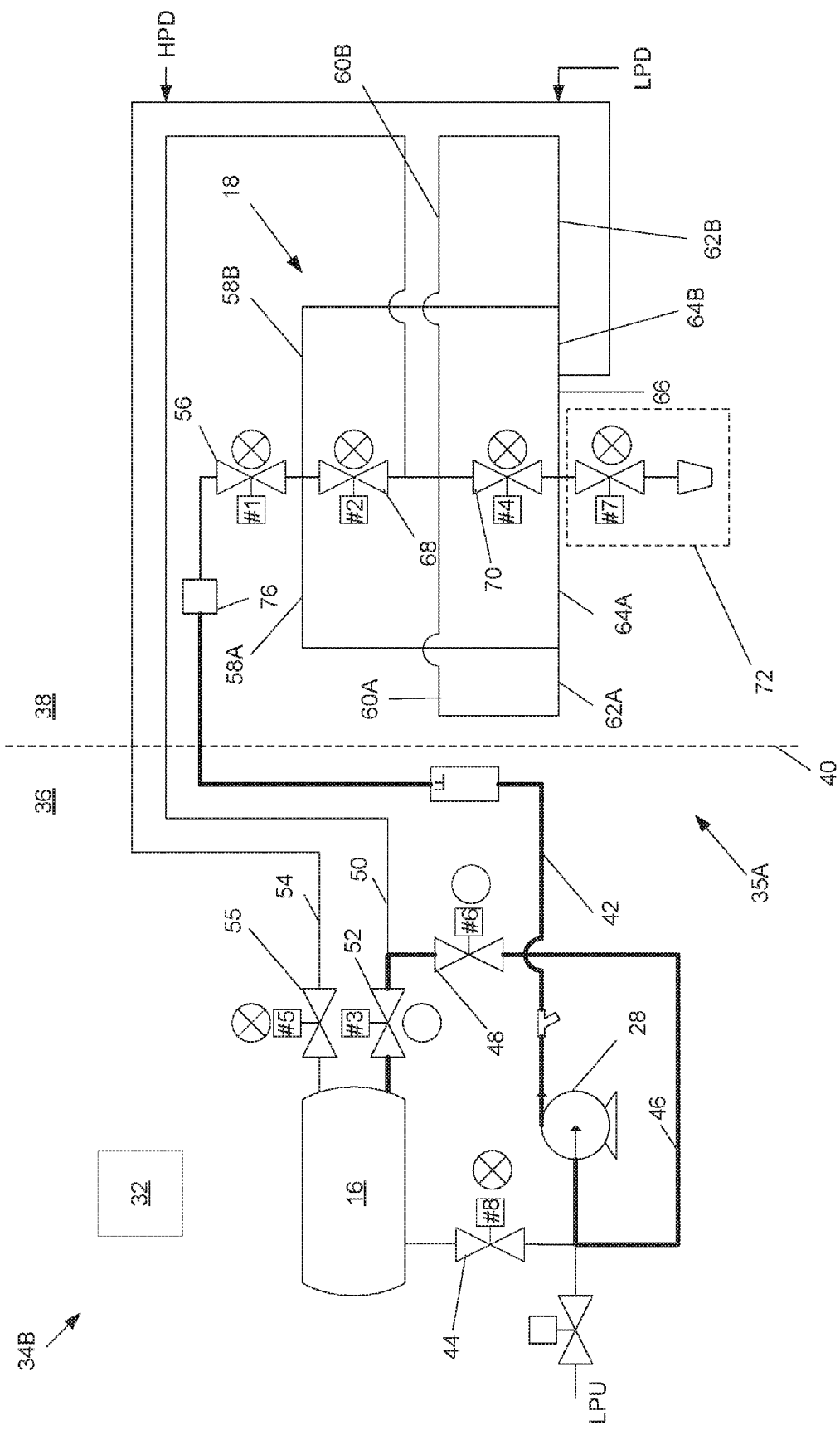

Referring now to stage 2 performed by an embodiment of a mobile machine plumbing system 34B, as depicted in FIG. 4B, product recovery occurs highest point in the plumbing circuit 35A back to the centrifugal pump 28 and the upstream recirculation line 50 from the rear boom plumbing assembly 18. Note that, in effect, there are essentially three (3) HPDs in the plumbing circuit 35A, including the main delivery line 42, the recirculatory line 50, and the downstream product recovery line 54. In one embodiment, the liquid product in the main delivery line 42 and the recirculatory line 50 are reclaimed in the upstream product recovery line 46. Stage 2 recovers the residual product to the product tank 16 through the upstream product recovery line 46, which may be embodied as a small hose coupled via a portion of the recirculatory line 50 to the product tank 16. As shown in FIG. 4B, the upstream product recovery line 46 couples the lowest point of the upstream manifold (LPU) to the recirculatory line 50, through which the liquid product is forced (under the influence of the pressurized gas) into the main product tank 16. It is noteworthy that, as a result of the completion of the stage 1 process (FIG. 4A), the gas (e.g., air) is compressed within the plumbing circuit 35A from the highest point downstream to the rear boom plumbing assembly 18. Accordingly, liquid product is restricted from moving into this area of the plumbing circuit 35A while the liquid product in the upstream suction plumbing is being recovered directly to the product tank 16. Once a short period of lapsed time has been reached (e.g., thirty (30) seconds, for the example shown in FIG. 5), the recirculatory valve (#3) 52 is closed by the controller 32. The controller 32 causes the closing of the following valves of the plumbing circuit 35A in stage 2, as represented by the X-filled circles adjacent the respective valves: the sump valve (#8) 44, the nozzles (#7) 72, the main shut off valve (#1) 56, the center boom feed valve (#2) 68, the product recovery rear manifold valve (#4) 70, and the product recovery downstream valve (#5) 55. The controller 32 also causes the injection of pressurized gas (e.g., air) into the air inlet 76 and causes the following valves of the plumbing circuit 35A to be opened, as represented by the open circles adjacent the respective valves: the recirculatory valve (#3) 52 and the product recovery upstream valve (#6) 48. Note that in one embodiment, air is continuously on (no interruptions) throughout all stages 1-4, though in some embodiments, an interruption may be imposed between one or more stages. In effect, as indicated by the bold overlay in FIG. 4B, the liquid product moves from the air inlet 76 through the main delivery line 42, the centrifugal pump 28, the upstream product recovery line 46, the product recovery upstream valve (#6) 48, the recirculatory valve #3 (52), and to the product tank 16.

Figure 4C:
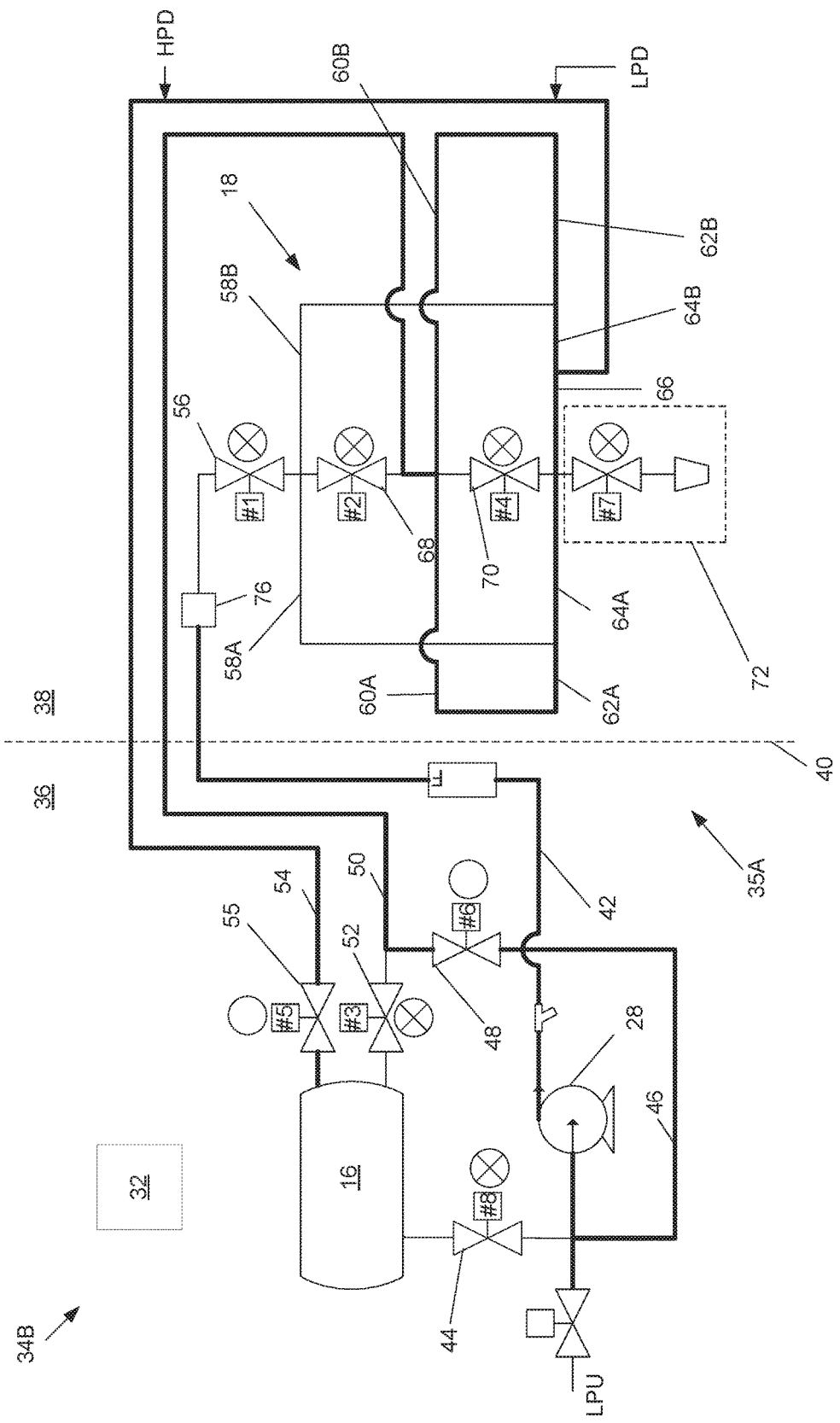

Referring to FIG. 4C, shown is a stage 3 product recovery implemented by an embodiment of the mobile machine plumbing system 34B for the recirculatory line 50, the outer feed tubes 60, and the outer spray tubes 62. In other words, the stage 3 process recovers the residual product from the outer spray tubes 62 back to the product tank 16. Pressurized gas (e.g., air) continues to push residual product through the recirculatory line 50 back to the rear boom plumbing assembly 18. Since the center boom feed valve (#2) 68 and the product recovery rear manifold valve (#4) 70 of the boom plumbing assembly 18 are closed, the residual product has to travel through the outer feed tubes 60 to the ends of the boom plumbing assembly 18. The main feed tubes 58 on the boom plumbing assembly 18 are restricted from being purged of liquid product due to having the main shut-off valve (#1) 56 closed to prevent flow from back feeding into the main delivery line 42. The product recovery rear manifold valve (#4) 70 is closed to prevent the liquid product from escaping directly to the center spray tube 66 and travelling directly to the product recovery system valve (#5) 55. The path the residual product has to take is to the end points of the boom plumbing through the outer feed tubes 60. As air continues to push residual through the outer spray tubes 62 and into the inner spray tubes 64, the residual product is directed to the center spray tube 66. The downstream product recovery line 54 couples the bottom side of the center spray tube 66 to the top side of the main product tank 16. Note from FIG. 5 that the booms are tilted upwards and downwards for short periods of time (e.g., twenty-forty seconds) to gravity assist in product recovery of the outer spray tubes 62. The controller 32 causes the various opening and closing of the valves, as previously described in association with FIGS. 4A-4B, as well as the pressurized gas flow. For the closing of the valves (represented by the X-filled circles adjacent the respective valves in FIG. 4C), the controller 32 causes the actuation of the following valves: the sump valve (#8) 44, the nozzles (#7) 72, the main shut off valve (#1) 56, the center boom feed valve (#2) 68, the recirculatory valve (#3) 52, and the product recovery rear manifold valve (#4) 70. The controller 32 causes the injection of air into the air inlet 76, and also causes the following valves to open (as represented by the open circles adjacent the respective valves): the product recovery downstream valve (#5) 55 and the product recovery upstream valve (#6) 48. As depicted in bold overlay on the plumbing in FIG. 4C, the influence on the liquid product is primarily effected in the recirculatory line 50, through the outer feed tubes 60, the outer and inner spray tubes 62, 64, and the center spray tube 66, and through the downstream product recovery line 54 to the product tank 16 (e.g., via the product recovery downstream valve (#5) 55).

Figure 4D:
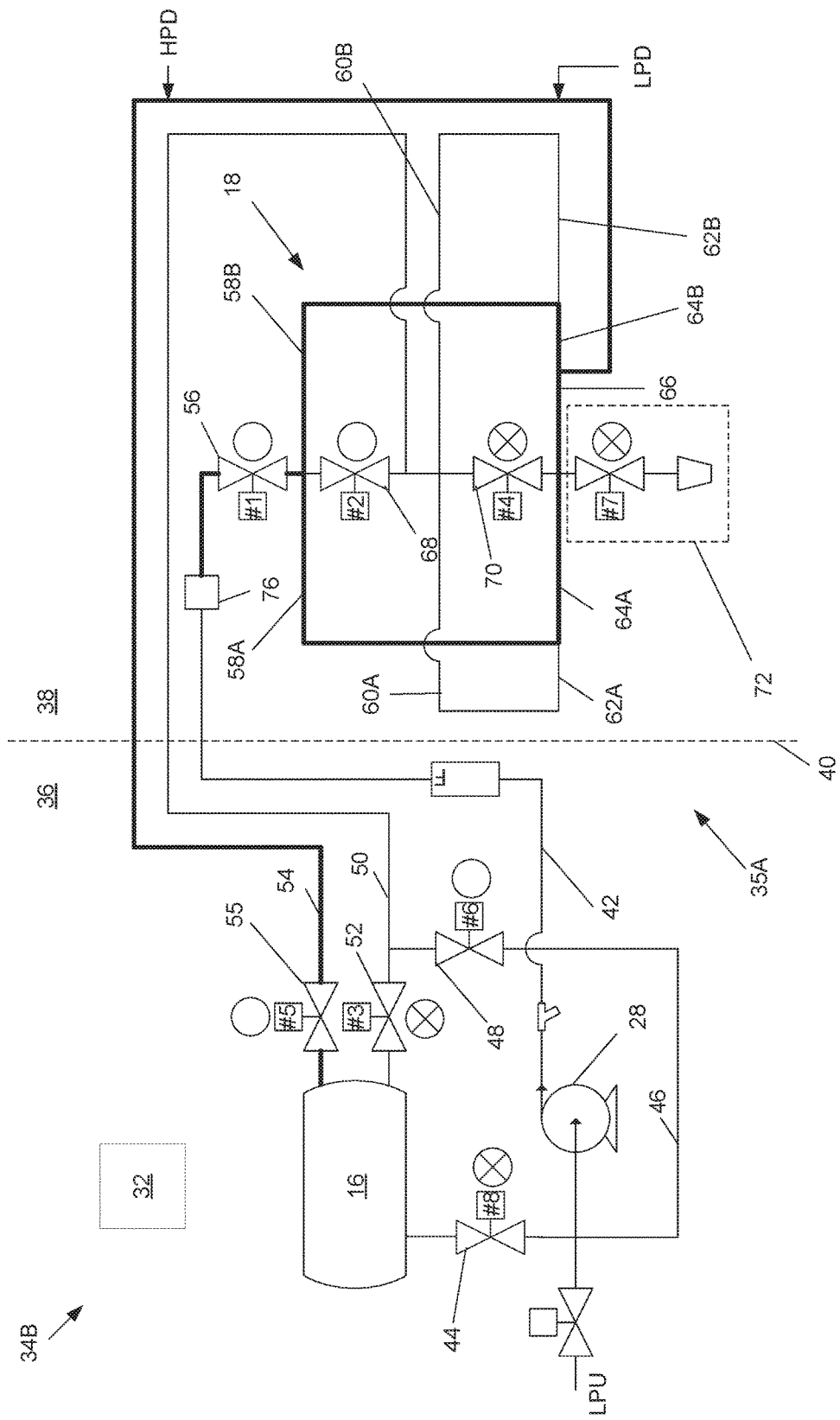

In FIG. 4D, stage 4 processing performed by an embodiment of the mobile machine plumbing system 34B is depicted where product recovery occurs at the highest point in the plumbing circuit 35A to the main feed tubes 58 on the boom plumbing and the inner spray tubes 64. Stage 4 recovers the residual product in the inner spray tubes 64 of the boom plumbing. In one embodiment, the controller 32 causes the main shut-off valve (#1) 56 and the center boom feed valve (#2) 68 to open, enabling the pressurized gas (e.g., air) to push the liquid product outwards through the main feed tubes 58. With stage 3 complete, the outer spray tubes 62 on the boom plumbing assembly 18 are purged from residual product and act as a pressurized chamber, prohibiting no (or any significant) travel back to the outer spray tubes 62 on the booms. The residual product in the main feed tubes 58 is diverted into the inner spray tubes 64, and this residual product is pushed into the center spray tube 66. The downstream product recovery line 54 permits the remaining residual product back to the main product tank 16.

As indicated in FIG. 5, the booms are tilted upwards and downwards for short periods of time (e.g., thirty (30) seconds each) to gravity assist in the product recovery. The controller 32 effects stage 4 processing by closing (as represented by the X-filled circles next to the respective valves) the following valves: the sump valve (#8) 44, the nozzles (#7) 72, the recirculatory valve (#3) 52, and the product recovery rear manifold valve (#4) 70. The controller 32 also causes the injection of the pressurized gas (e.g., air) and causes the following valves to open (as represented by the open circles adjacent the respective valves): the main shut off valve (#1) 56, the center boom feed valve (#2) 68, the product recovery downstream valve (#5) 55, and the product recovery upstream valve (#6) 48. As shown in the bolded overlay in FIG. 4D, the product recovery is effected primarily through the main feed tubes 58, the inner and center spray tubes 64, 66, respectively, and the downstream product recovery line 54 to the product tank 16 (via the product recovery downstream valve (#5) 55).

It should be appreciated by one having ordinary skill in the art in the context of the present disclosure that variations to the recovery process may be implemented in some embodiments. For instance, as indicated above, the stages may be implemented in a different order than described above, such as stage 2 and stage 4 switching places in the described order (e.g., stage 2 is last). In some embodiments, functionality of the two or more valves may be combined, such as the recirculatory valve (#3) 52 and the product recovery downstream valve (#6) 48 combined as a 3-way valve (e.g., a 3-way ball valve). Also, similar to that described in association with the system 34A of FIG. 3A, additional components may include an air relay, an air pressure regulator, and/or a larger air reservoir.

Note that the valves may be comprised of actuators driven by electric, hydraulic, pneumatic, and/or alternative energy sources, and that the valves are generally comprised of a material suitable for the liquid product intended to be used in the plumbing circuit 35, such as stainless steel material, polypropylene material, and/or other material suitable for corrosion resistance in chemical environments. Also, the plumbing may be comprised of hoses and/or tubing (collectively, conduit) made of a rubber-based materials, copper or stainless tubing, or any combination thereof, among other materials. Reference herein to "lines" may refer to a single hose or other conduit, with sizing dependent on a design balance between air loss and capacity, among other factors as would be appreciated by one having ordinary skill in the art.

Figure 6:
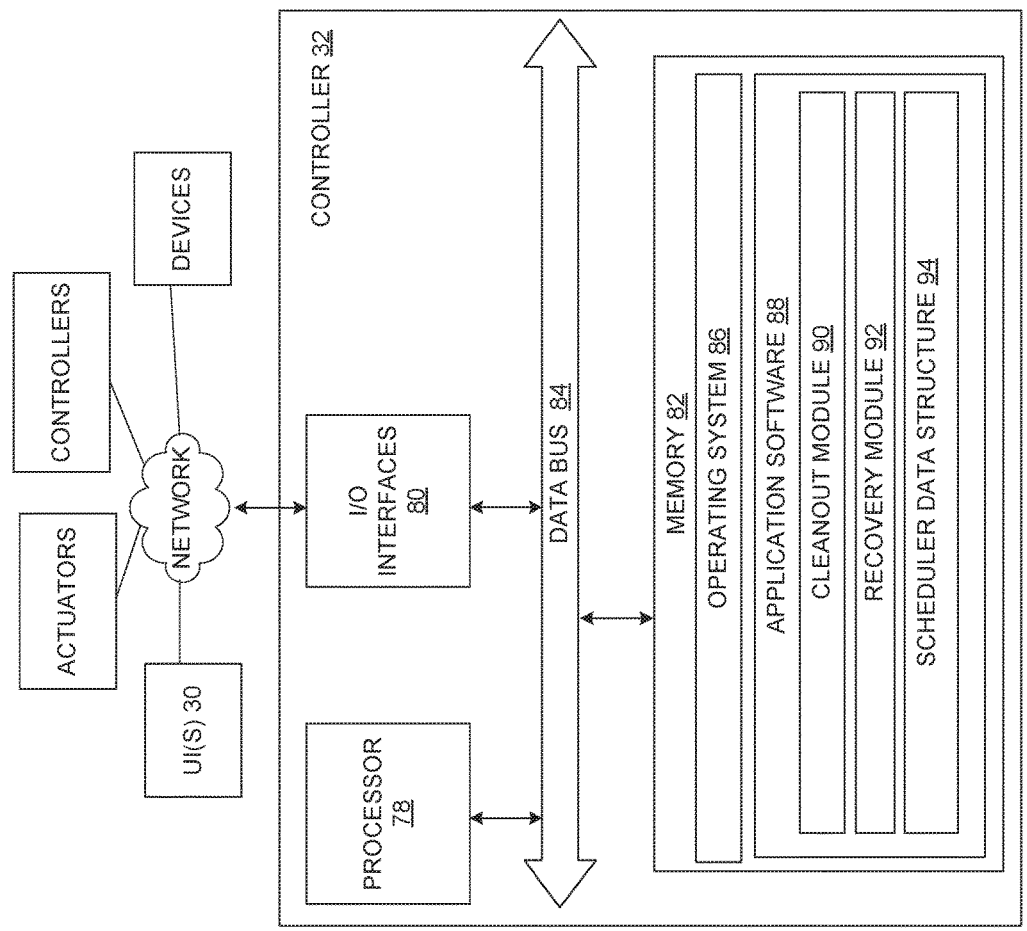
FIG. 6 is a block diagram that illustrates an embodiment of an example controller of the mobile machine plumbing system.
Figure 7:
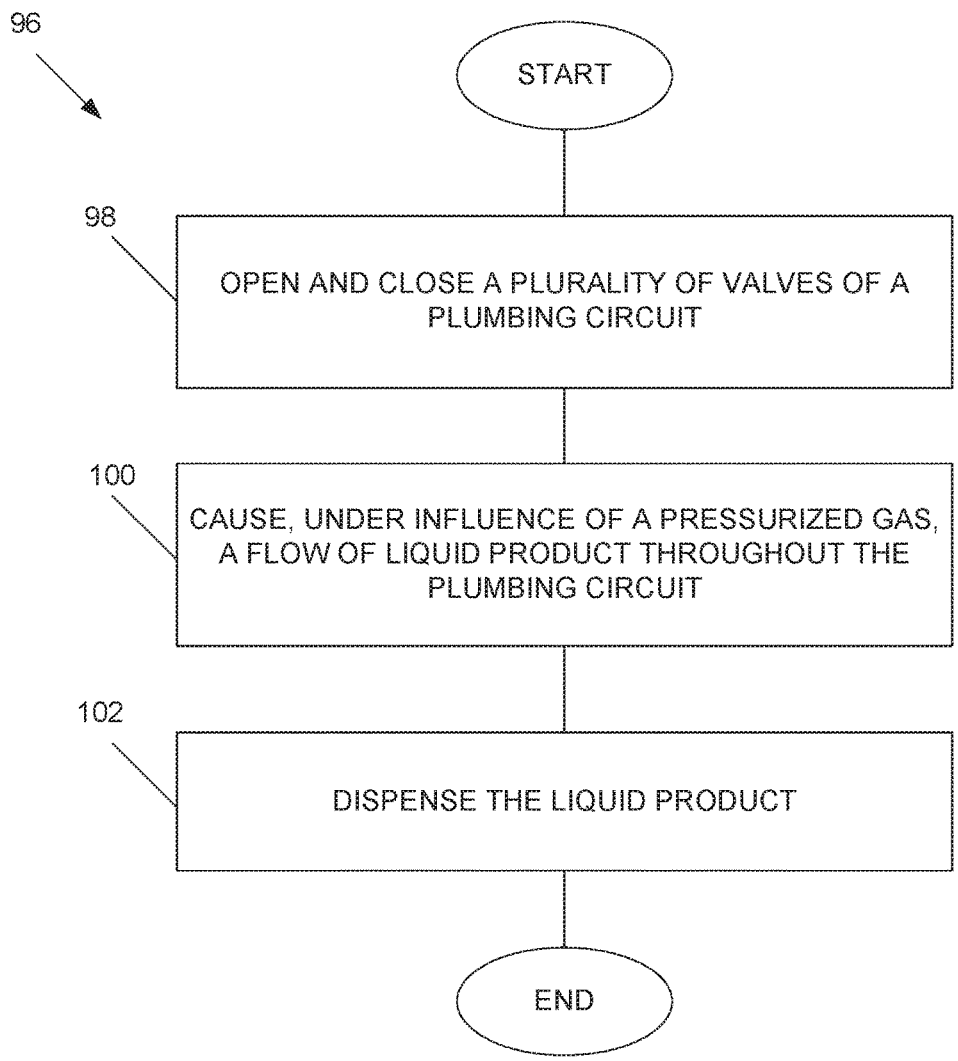
FIG. 7 is flow diagram that illustrates an embodiment of an example mobile machine plumbing method.

Having described some example processes performed by certain embodiments of a mobile machine plumbing system 34 (e.g., 34A, 34B), attention is directed to FIG. 6, which illustrates an embodiment of the example controller 32. One having ordinary skill in the art should appreciate in the context of the present disclosure that the example controller 32 is merely illustrative, and that some embodiments of controllers may comprise fewer or additional components, and/or some of the functionality associated with the various components depicted in FIG. 6 may be combined, or further distributed among additional modules, in some embodiments. Also, though certain embodiments of the systems 34 are described herein using a single controller 32, in some embodiments, multiple controllers may be used to perform the same or similar functions. It should be appreciated that, though described in the context of residing in the mobile machine 12, in some embodiments, the controller 32 or its corresponding functionality may be implemented in a computing device or devices located external to the mobile machine 12 and/or field (e.g., through remote control for autonomous operations or semi-autonomous operations via telemetry equipment in the mobile machine 12). The controller 32 is depicted in this example as a computer system (e.g., a personal computer or workstation, an electronic control unit or ECU, etc.), but may be embodied as a programmable logic controller (PLC), field programmable gate array (FPGA), among other devices. It should be appreciated that certain well-known components of computer systems are omitted here to avoid obfuscating relevant features of the controller 32. In one embodiment, the controller 32 comprises one or more processors, such as processor 78, input/output (I/O) interface(s) 80, and memory 82, all coupled to one or more data busses, such as data bus 84. The memory 82 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 82 may store a native operating system, one or more native applications, emulation systems, or emulated applications for any of a variety of operating systems and/or emulated hardware platforms, emulated operating systems, etc. In the embodiment depicted in FIG. 6, the memory 82 comprises an operating system 86, an application software 88. In one embodiment, the application software 88 comprises a cleanout module 90, a recovery module 92, and a scheduler data structure 94. The cleanout module 90 and the recovery module 92 each comprises executable code that, when executed by the processor 78, causes the actuation of valves of the plumbing circuit 35 (FIGS. 3 and 4A-4D) and air injection (e.g., via actuation of a compressor and actuable port or valve associated with the air inlets 74, 76 (FIGS. 3 and 4A)). A schedule of the sequencing of valves, and other actuable devices, such as actuators that control the lifting and lowering of the valves, the independent sectioning and control of respective nozzle banks, activation and/or deactivation of the pump, etc.), may be accessed within each of the modules 90, 92, or via the scheduler data structure 94. In one embodiment, the scheduler data structure 94 may be arranged similarly in information to the schedule depicted in, and described in association with, FIG. 5. It should be appreciated that in some embodiments, additional (e.g., browser, APIs, or if located remotely, web-host network software) or fewer software modules (e.g., combined functionality) may be employed in the memory 82 or additional memory. In some embodiments, a separate storage device may be coupled to the data bus 84 (or via the I/O interfaces 80, such as a persistent memory (e.g., optical, magnetic, and/or semiconductor memory and associated drives). In some embodiments, the software modules 90, 92 may be further distributed among additional application software, or their respective functionality combined into fewer modules.

Note that in some embodiments, aside from initiating the processes, the operator may be involved (e.g., via a user interface 30) at various times during the cleanout and/or recovery processes. For instance, in the case of the recovery process, the controller 32 may prompt the operator on the UI 30 to initiate one or more functions or tasks (e.g., by instructing the operator to manipulate one or more switches, buttons, touch-type icons, etc.), such as to cause the tilting of the boom upwards or downwards.

Execution of the application software 88 (e.g., the software modules 90, 92) is implemented by the processor 78 under the management and/or control of the operating system 86. The processor 78 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 32.

The I/O interfaces 80 provide one or more interfaces to a local network, such as a controller area network, among other networks (e.g., local area networks, wide area networks, etc., accessed via a radio and/or cellular modem). In other words, the I/O interfaces 80 may comprise any number of interfaces for the input and output of signals (e.g., analog or digital data) for conveyance of information (e.g., data) over the network. The input may comprise input by an operator or user (operator or user used interchangeably hereinafter, such as to control and/or monitor operations of the mobile machine 12 locally or remotely) through the user interfaces 30 (e.g., 30A, 30B, 30C), and input from other devices or systems coupled to the network, such as other controllers, actuators (e.g., solenoids, switches, relays, etc.) for the valves/nozzles, the centrifugal pump 28 (FIG. 3, such as for the motor), the air equipment, the boom plumbing assembly 18 (FIG. 3) and corresponding structure, among other devices. In some embodiments, at least one of the user interfaces 30 may be co-located with the controller 32, and coupled directly to the data bus 84 or indirectly via the I/O interfaces 80. The input interfaces may be in the form of any one or combination of a keypad, display screen (e.g., based on such known technologies as liquid crystal diode (LCD), light-emitting diode (LED), among others) with or without touch-screen technology, switches, buttons, dials, levers, microphones, etc.

When certain embodiments of the controller 32 are implemented at least in part as software (including firmware), as depicted in FIG. 6, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 32 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In view of the above description, it should be appreciated in view of the present disclosure that one embodiment of an example mobile machine plumbing method, depicted in FIG. 6 and denoted as method 96 comprises: opening and closing a plurality of valves of a plumbing circuit, the plumbing circuit comprising a first fluid circuit and a second fluid circuit (98); causing, under influence of a pressurized gas, a flow of liquid product through plumbing of the first fluid circuit that comprises a temporarily inactive centrifugal pump and a flow of liquid product through plumbing of the second fluid circuit that comprises a boom plumbing assembly having plural nozzles coupled to the boom plumbing assembly, the flow of the liquid product through the first and second fluid circuits controlled by the opening and closing of the plurality of valves (100); and dispensing the liquid product of the first and second fluid circuits to either a product tank or through the plurality of nozzles based on the flows through the first and second fluid circuits (102).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method for performing a cleanout process a plumbing system of a mobile machine by dispensing a liquid product from the plumbing system, the method comprising:
    opening and closing a plurality of valves of a plumbing circuit, the plumbing circuit comprising a first fluid circuit and a second fluid circuit;
    causing, under influence of a pressurized gas, a flow of liquid product through plumbing of the first fluid circuit that comprises a temporarily inactive centrifugal pump and a flow of liquid product through plumbing of the second fluid circuit that comprises a boom plumbing assembly having plural nozzles coupled to the boom plumbing assembly, the flow of the liquid product through the first and second fluid circuits controlled by the opening and closing of the plurality of valves; and
    dispensing the liquid product of the first and second fluid circuits through the plurality of nozzles based on the flows,
    wherein the plurality of valves of the second fluid circuit comprises a main shut-off valve in a closed position, and a center boom feed valve and a product recovery rear manifold valve in open positions, wherein causing the flow of liquid product through the plumbing of the second fluid circuit comprises causing the liquid product to flow through the center boom feed valve and the product recovery rear manifold valve and out of the plurality of nozzles.

2. The method of claim 1, wherein the first fluid circuit and the second fluid circuit are coupled via plumbing of a recirculatory line, and wherein the plurality of valves of the first fluid circuit comprises a recirculatory valve and a sump valve in closed positions and a product recovery upstream valve in an open position, wherein causing the flow of liquid product through the plumbing of the first fluid circuit comprises, based on receiving the gas from the center boom feed valve, causing the liquid to flow in first and second directions through each of the recirculatory line, the product recovery upstream valve, and the centrifugal pump.

3. The method of claim 2, wherein causing the flow of liquid product through the plumbing of the second fluid circuit further comprises causing the flow of the liquid product through the plurality of nozzles based on receiving the liquid flow of the first circuit through the plumbing of the recirculatory line.

4. The method of claim 3, further comprising toggling on and off the main shut-off valve.

5. The method of claim 1, wherein the plurality of valves of the first fluid circuit comprises a recirculatory valve and a sump valve in closed positions and a product recovery upstream valve in an open position, wherein the boom plumbing assembly is coupled to the product recovery upstream valve via a first conduit, and wherein causing the flow of the liquid product through the first fluid circuit comprises causing the flow of the liquid through the product recovery upstream valve and the first conduit.

6. The method of claim 5, wherein causing the flow of liquid through the second fluid circuit further comprises causing the liquid from the first conduit to flow through plumbing of the boom plumbing assembly and out of the plurality of nozzles.

7. A method for recovering a liquid product while performing a cleanout process of a plumbing system of a mobile machine, the method comprising:
    opening and closing a plurality of valves of a plumbing circuit, the plumbing circuit comprising a first fluid circuit and a second fluid circuit;
    causing, under influence of a pressurized gas, a flow of liquid product through plumbing of the first fluid circuit that comprises a temporarily inactive centrifugal pump and a flow of liquid product through plumbing of the second fluid circuit that comprises a boom plumbing assembly having plural nozzles coupled to the boom plumbing assembly, the flow of the liquid product through the first and second fluid circuits controlled by the opening and closing of the plurality of valves; and
    dispensing the liquid product of the first and second fluid circuits to a product tank based on the flows,
    wherein for a first stage, the plurality of valves of the second fluid circuit comprises a main shut-off valve, a center boom feed valve, and a product recovery rear manifold valve all in open positions and the plurality of nozzles in closed positions, and wherein the plurality of valves of the first fluid circuit comprises a recirculatory valve, a product recovery upstream valve, and a sump valve all in closed positions and a product recovery downstream valve in an open position, wherein causing the flow of liquid product through the plumbing of the first and second fluid circuits comprises causing the liquid product to flow through the main shut-off valve, the center boom feed valve, the product recovery rear manifold valve, plumbing of a downstream product recovery line, the product recovery downstream valve, and into the product tank.

8. The method of claim 7, wherein for a second stage, the main shut-off valve, the center boom feed valve, the product recovery rear manifold valve, the plurality of nozzles, the product recovery downstream valve, and the sump valve are all in closed positions and the recirculatory valve and the product recovery upstream valve are in open positions, wherein causing the flow of liquid product through the plumbing of the first circuit comprises causing the liquid product to flow through the centrifugal pump, the product recovery upstream valve, the recirculatory valve, and into the product tank.

9. The method of claim 8, wherein for a third stage, the main shut-off valve, the center boom feed valve, the product recovery rear manifold valve, the plurality of nozzles, the sump valve, and the recirculatory valve are all in closed positions, wherein the product recovery upstream valve and the product recovery downstream valve are all in open positions, wherein causing the flow of liquid product through the plumbing of the first and second circuits comprises causing, based on the pressure of the gas from a recirculating line that couples the first and second fluid circuits, the liquid product to flow from outer feed tubes of the boom plumbing assembly, to outer spray tubes of the boom plumbing assembly, to inner spray tubes of the boom plumbing assembly, to a center spray tube of the boom plumbing assembly, and through a second conduit coupling the center spray tube to the product tank.

10. The method of claim 9, further comprising causing the boom plumbing assembly to be tilted upwards and downwards during at least a portion of the third stage.

11. The method of claim 9, wherein for a fourth stage, the main shut-off valve, the center boom feed valve, the product recovery upstream valve, and the product recovery downstream valve are all in open positions, wherein the product recovery rear manifold valve, the plurality of nozzles, the sump valve, and the recirculatory valve are all in closed positions, wherein causing the flow of liquid product through the plumbing of the first and second circuits comprises causing, based on the pressure of the gas from opening the main shut-off valve and the center boom feed valve causing the liquid to push out toward through main feed tubes of the boom plumbing assembly and the pressure in the outer spray tubes resulting from a purging of the liquid in the third stage, the liquid product to flow from the main feed tubes through the inner spray tubes and the center spray tube and through the second conduit to the product tank.

12. The method of claim 11, further comprising causing the boom plumbing assembly to be tilted upwards and downwards during at least a portion of the fourth stage.

13. The method of claim 11, wherein the second stage is implemented second in order of stages or last in the order of stages.

14. The method of claim 11, wherein the recirculatory valve and the product recovery upstream valve are combined into a three-way valve.

* * * * *